(12) United States Patent
DiStasio et al.

(10) Patent No.: US 6,430,474 B1
(45) Date of Patent: Aug. 6, 2002

(54) TOOLING ADAPTER FOR ALLOWING SELECTED MANIPULATION OF A WORKPIECE

(75) Inventors: Christopher C. DiStasio, Rochester, NY (US); Nathaniel W. Haslam, Dublin (IE)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/825,586

(22) Filed: Apr. 3, 2001

(51) Int. Cl.[7] .............................................. G06F 19/00
(52) U.S. Cl. ...................... 700/245; 700/247; 700/248; 700/255; 700/259; 700/260; 318/568.1; 318/568.2; 318/568.11; 318/568.14; 901/4; 901/5; 901/9; 901/15; 901/42; 901/47; 701/23
(58) Field of Search .................... 700/86, 245, 255, 700/259, 114, 250, 258, 263, 247, 260, 248, 251; 318/568.11, 568.14, 568.2, 568.1, 687; 219/124.34; 324/758; 600/427; 701/23; 901/4, 5, 9, 15, 18, 42, 47, 30; 483/55, 33, 901

(56) References Cited

U.S. PATENT DOCUMENTS

| | | | | | |
|---|---|---|---|---|---|
| 3,890,552 A | * | 6/1975 | Devol et al. | ............ | 318/568.14 |
| 4,380,696 A | * | 4/1983 | Masaki | ................ | 219/124.124 |
| 4,568,816 A | * | 2/1986 | Casler, Jr. | ............... | 219/124.34 |
| 4,636,137 A | * | 1/1987 | Lemelson | .................... | 414/730 |
| 4,704,568 A | * | 11/1987 | Beck et al. | .................. | 318/687 |
| 4,831,549 A | * | 5/1989 | Red et al. | .................... | 700/254 |
| 4,942,538 A | * | 7/1990 | Yuan et al. | .................. | 700/259 |
| 5,495,410 A | * | 2/1996 | Graf | ............................ | 700/86 |
| 5,880,956 A | * | 3/1999 | Graf | ............................ | 700/86 |
| 5,898,179 A | * | 4/1999 | Smick et al. | .......... | 250/492.21 |
| 6,150,828 A | * | 11/2000 | Farnworth et al. | .......... | 324/758 |
| 6,278,906 B1 | * | 8/2001 | Piepmeier et al. | .......... | 700/250 |
| 6,285,902 B1 | * | 9/2001 | Kienzle, III et al. | ........ | 600/427 |

OTHER PUBLICATIONS

Wambacq, IVAR '94 tutorial image acquisition and display, 1994, Internet, pp. 1–35.*
Sicard et al., Joint recognition and tracking for robotic arc welding, 1989, IEEE, pp. 714–728.*
Hu et al., Landmark–based navigartion of mobile robots in manufacturing, 1999, Internet/IEEE, pp. 121–128.*

* cited by examiner

*Primary Examiner*—William A. Cuchlinski, Jr.
*Assistant Examiner*—McDieunel Marc
(74) *Attorney, Agent, or Firm*—Fay, Sharpe, Fagan, Minnich & McKee, LLP

(57) ABSTRACT

A system for manipulating a workpiece in an industrial robot system having a manipulator device for manipulating the workpiece, a tooling adapter coupled to the manipulator device for manipulating the workpiece, and an image referencing system for acquiring image data corresponding to the workpiece without interference from the manipulator device.

17 Claims, 4 Drawing Sheets

TOOLING ADAPTER FOR ALLOWING SELECTED MANIPULATION OF A WORKPIECE

BACKGROUND OF THE INVENTION

The present invention relates generally to industrial robot systems, and more particularly relates to industrial robot systems used for fabricating components for image forming systems.

Many industrial robot systems utilized to perform precision assembly of electronic devices such as, electronic devices containing multiple Light Emitting Diodes (LED) for use in image forming systems, such as scanners and printers, are capable of achieving a workpiece placement accuracy of between 25 microns and 50 microns. Nonetheless, in a high volume manufacturing setting, the component placement accuracy of the industrial robot deteriorates during use. For example, the stresses associated with repetitive movements cause thermal warming and cooling which significantly impacts the systems placement accuracy. As a result, workpiece placement accuracy of greater than 15 microns is difficult to achieve in a high volume manufacturing environment.

The conventional method and apparatus for achieving greater workpiece placement accuracy with an industrial robot system has been to use two fixed cameras located over the workpiece placement location. The two fixed cameras identify a desired workpiece placement location by imaging the desired placement location and the industrial robot to provide feedback correction data. The benefits of this technique include the negation of inaccuracies caused by thermal cycling, e.g., warming and cooling, and the correction of inherent industrial robot movement inaccuracies.

The use of two fixed cameras located over a workpiece placement location does not provide sufficient accuracy when placing multiple workpieces in a densely populated electronic device. Specifically, the two fixed cameras cannot accurately view multiple chips over the length or width of the populated substrate, and therefore, lacks the ability to align multiple workpieces relative to one another. As such, high workpiece density electronic devices requiring workpiece placement accuracy better than 15 to 25 microns is burdensome and oftentimes requires manual labor intervention to ensure accurate workpiece placement.

Because a single point pick up tool, such as a vacuum pen, has a small profile relative to the workpiece, the use of a single point tool facilitates the imaging of the retrieved workpiece. Nonetheless, conventional workpieces lack sufficient rigidity to be picked and placed using the tool.

SUMMARY OF THE INVENTION

The present invention addresses the above described problems of conventional assembly tooling utilized in manufacture of electronic devices requiring highly accurate component placement. In particular, the present invention provides a tooling adapter for use with an industrial robot system that facilitates high component placement accuracy.

The present invention is directed to a system for manipulating a workpiece in an industrial robot system having a manipulator device for manipulating the workpiece, a tooling adapter coupled to the manipulator device for manipulating the workpiece when disposed in selected engagement therewith, and an image referencing system for acquiring image data corresponding to the workpiece.

According to one aspect, the system can also include an air bearing assembly coupled to the manipulator device and the image referencing system, where the manipulator device and/or the image referencing system can move along the air bearing assembly. The system can also include a base coupled to one or more support members that support the air bearing assembly.

According to another aspect, the image referencing system comprises an image acquisition element, and optionally one or more of an optical lens coupled to the image acquisition element, a prism optically coupled to the image acquisition element, and a quill disposed between the optical lens and the prism.

According to another aspect, the tooling adapter can include a viewing window positioned relative to the image referencing system for allowing the image referencing system to acquire the image data corresponding to the workpiece without interference from the manipulator device. The tooling adapter can also include a vacuum assembly for applying a force to a workpiece for manipulating the workpiece.

According to another aspect, the tooling adapter comprises a housing have a platen top surface adapted for coupling to the manipulator device, one or more walls coupled to the platen, and a bottom portion coupled to the wall. The bottom portion comprises a vacuum assembly having a plurality of ports for applying a force to the workpiece when disposed in contact therewith.

According to another aspect, the bottom portion of the tooling adapter further include a window for allowing the image referencing system to acquire the image data of the workpiece without interference from the manipulator device.

The present invention also provides for a method for manipulating a workpiece comprising the steps of manipulating the workpiece with a manipulator device, coupling a tooling adapter to the manipulator device, and acquiring image data corresponding to the workpiece without interference from the manipulator device.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and are not to scale.

DETAILED DESCRIPTION OF THE INVENTION

The illustrative embodiment of the present invention provides a tooling adapter for use in manufacturing electronic assemblies requiring highly accurate component placement. Specifically, the present invention provides a tooling adapter that allows an imaging system of an industrial robot system to image a selected workpiece without causing a degradation in component placement accuracy.

Generally, a single point pickup tooling adapter, such as a vacuum tip or pen, is sufficient for a manipulator device to manipulate, e.g., pick and place, workpieces. Because a vacuum tip or pen works best with a fairly rigid workpiece, thin pliant films or components, such as a protective window covering for a LED display, cannot be manipulated with the accuracy required by the electronic device or the industrial robot system. The present invention addresses this need by allowing a manipulator device to manipulate workpieces having questionable rigidity with high accuracy.

In a first illustrative embodiment, the tooling adapter is suitable for operating in a high volume manufacturing environment since it has minimal weight and is able to manipulate both leaded and leadless devices with multiple workpiece contact points. In an alternate embodiment, the tooling adapter can manipulate workpieces having questionable rigidity. Both illustrative embodiments provide the advantage of being able to pick and place workpieces of multiple shapes and weight, while concomitantly achieving high workpiece placement accuracy of between about 5 and about 10 microns.

Figure 1:
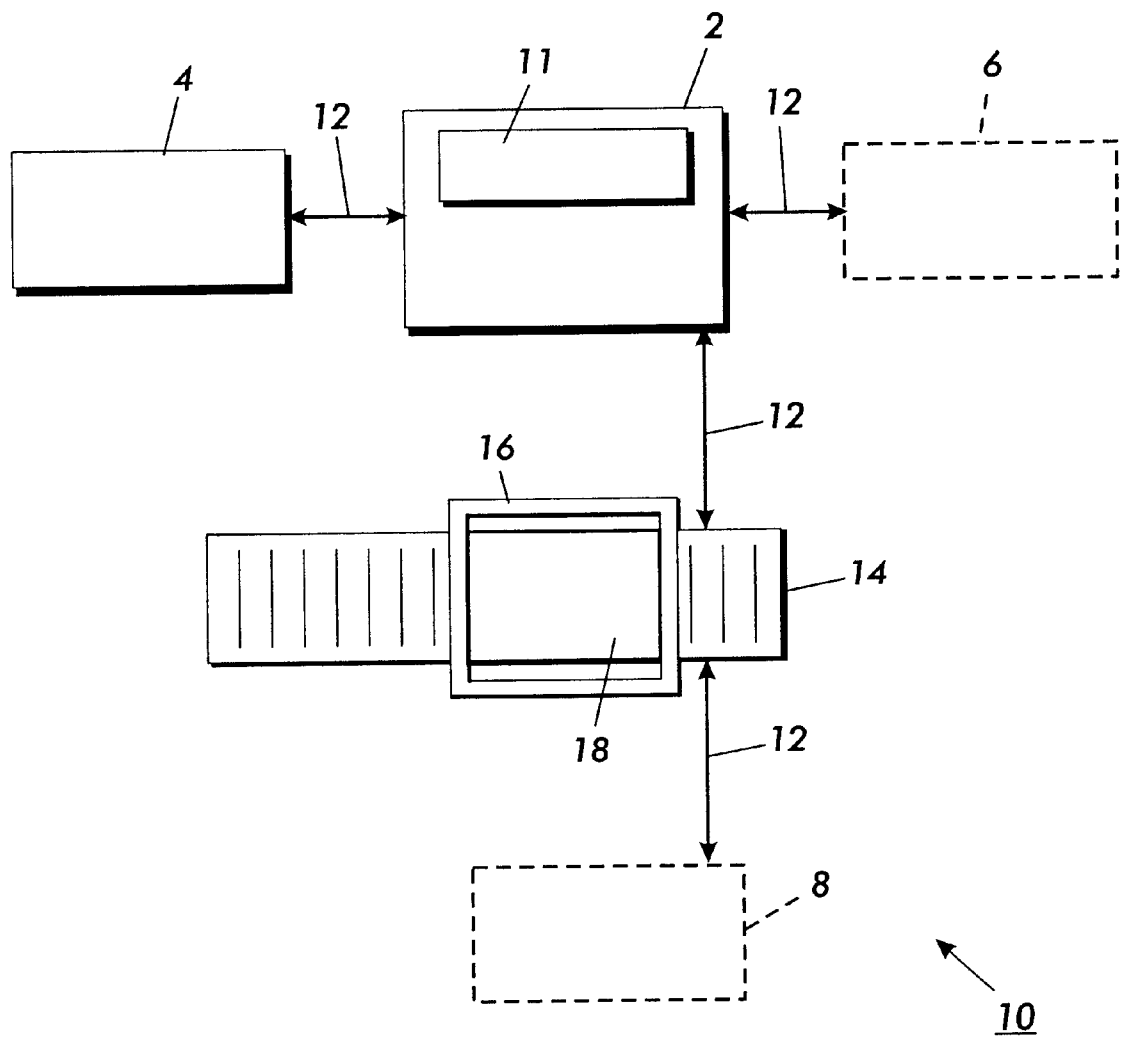
FIG. 1 is a schematic block diagram of an industrial robot system suitable for manufacturing components used in an image forming system according to the teachings of the present invention.

FIG. 1 shows a schematic block diagram depiction of an industrial robot system 10 employing image referencing systems 6 and 8. As illustrated, the industrial robot system 10 includes a manipulator device 2 having an electronic controller 11. The electronic controller 11 operates to control the movement of the manipulator device 2, and to coordinate the interaction of the various devices interfacing with the industrial robot system 10. The illustrated controller 11 communicates with the various system peripheral devices, such as workpiece source 4, imaging reference systems 6 and 8, and precision air bearing assembly 14, via the communication links 12 to coordinate the interaction of the various devices. The communication links 12 can be any suitable interconnection for use in transmitting and/or receiving signals corresponding to instructions or data between one or more of the devices. For example, the communication link 12 can be an electrical or optical cable, such as a parallel cable, serial cable, flex print, and the like, or can represent a wireless connection.

According to one practice, the controller 11 directs the manipulator device 2 to retrieve a component from the workpiece source 4. The workpiece source 4 can include a tray compartment holding a desired workpiece. The workpiece source 4 can signal the controller 11 to halt the manipulator device 2 when the workpiece source 4 is out of workpieces or during a workpiece replenishment operation. Those of ordinary skill in the art will readily recognize that the workpiece source 4 can include an automated material handler apparatus, which may be a magazine type material handler, a lead frame magazine type handler, or a waffle tray type material handler, suitable for holding a workpiece. The interaction of the manipulator device 2 with the imaging reference system 6, the imaging reference system 8, and the air bearing assembly 14 will be described in more detail below.

One skilled in the art will recognize that the controller 11 may be any commercially available industrial controller suitable for providing motion control of an industrial robot. Such a controller may be a next generation robot controller or XRC controller manufactured by Motoman, Inc. of West Carrolton Ohio.

Figure 2:
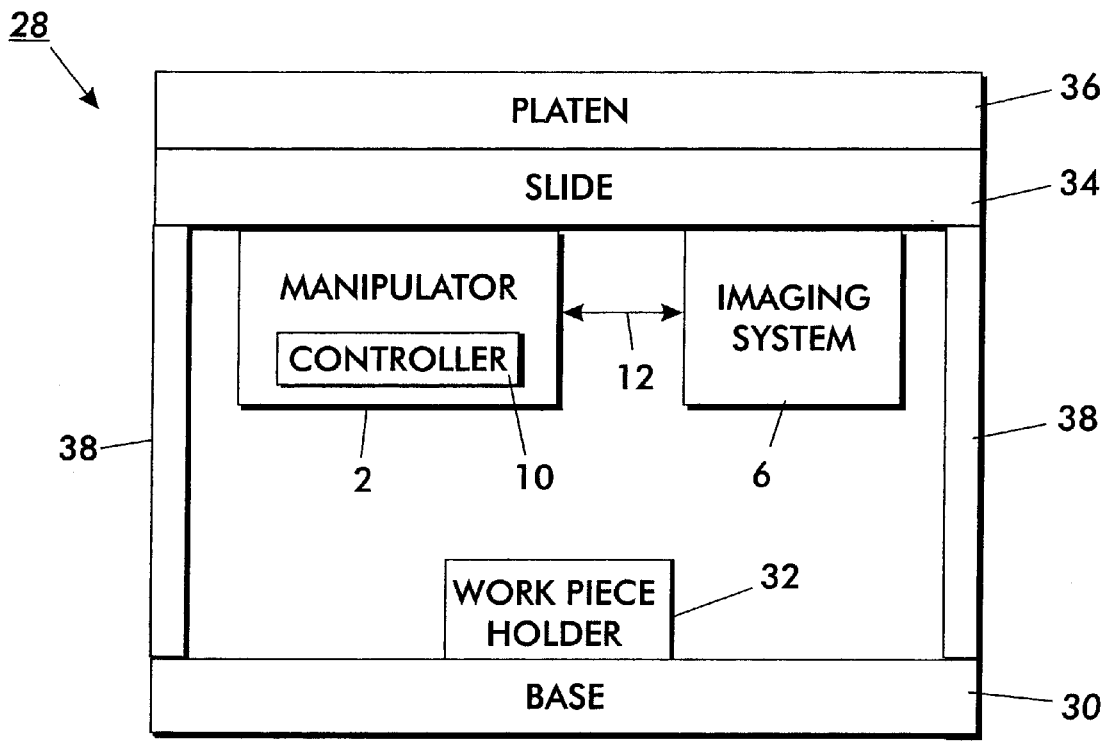
FIG. 2 is a perspective view of an industrial workcell housing an industrial robot and an associated reference imaging system according to the teachings of the present invention.

As illustrated in FIG. 2, the industrial robot system 10 may be housed in a modular workcell 28. The modular workcell 28 includes a fixed based 30 adapted to support the two vertical support members 38. A first end of the vertical support member 38 is coupled to the base 30 and a second end of the vertical support member 38 is coupled to the bottom side of air bearing slide assembly 34. Also coupled to bottom side of the air bearing slide 34 are the manipulator device 2 and the imaging reference system 6. A platen. 36 is coupled to the topside of the air bearing slide 34.

The illustrated air bearing assembly 34 allows the manipulator device 2 and the imaging reference system 6 to move in an X-Y direction above the base 30 and along the assembly. In this manner, the imaging reference system 6 is capable of vertically aligning a workpiece on the workpiece holder 32. This arrangement increases the workpiece placement accuracy of the manipulator device 2 to between about 1 micron and about 3 microns.

Figure 3:
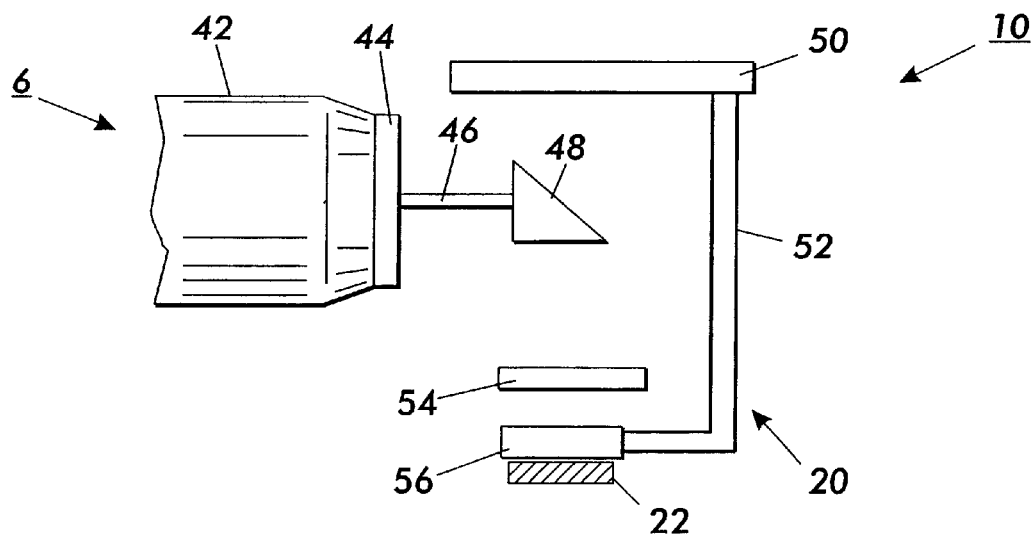
FIG. 3 is a side perspective view of a tooling adapter suitable for use in the present invention.
Figure 4:
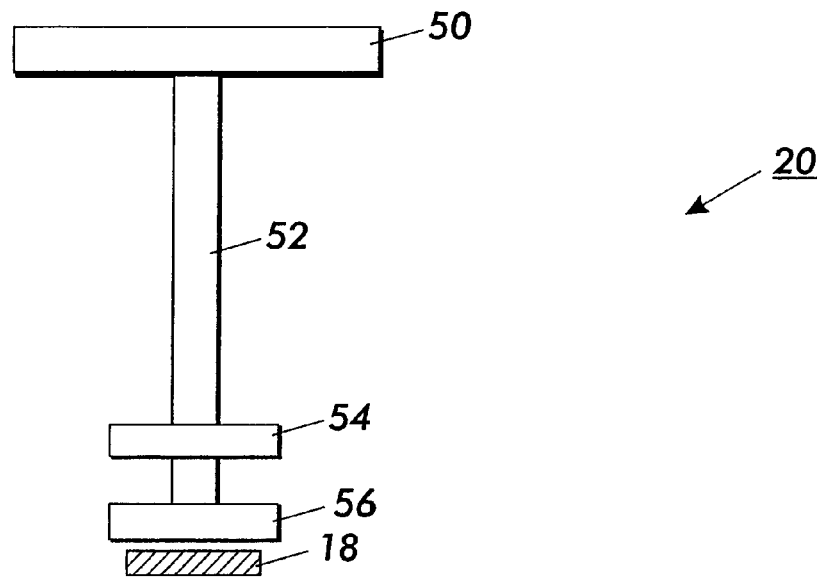
FIG. 4 is a front perspective of a tooling adapter suitable for use in the present invention.

FIGS. 3 and 4 illustrate a first embodiment of the tooling adapter of the present invention. As depicted, the system 10 employs a tooling adapter 20 having a platen 50 that has a top surface adapted to mount to a quill or other mechanical device suitable for accepting a tooling adapter of the manipulator device 2. An arm member 52 extends downwardly from the platen, and provides structural support for the viewing window 54 and the vacuum tool or assembly 56. The vacuum assembly can be any suitable assembly for applying a force to workpiece to move the workpiece between locations. One skilled in the art will recognize that the structural elements of the tooling adapter 20 may be manufactured from materials such as aluminum, manganese, fiberglass or other composite material, titanium, and other like materials.

The illustrated image referencing system 6 includes an image acquisition device 42, such as a camera, for acquiring or capturing image data. The term image acquisition device as used herein is intended to include any device suitable for capturing or acquiring image data. Examples of suitable image acquisition devices include cameras, such as a video camera that records at a video frame rate (i.e., 30 frames per second), monochrome camera, color camera, CCD camera, and other like devices. The term camera is used hereafter for the sake of simplicity. The camera 42 is coupled to a lens 44, which in turn is coupled to the optical quill 46. The quill 46 terminates in an optical prism 48. This optical subassembly in combination with the camera 42 acquires image data of a workpiece 22 that is temporarily attached to the bottom side of the vacuum tool 56. In this manner, the camera 42 is able to identify the selected workpiece 22, and based on one or more workpiece fiducials, provide vision feedback information to a controller 11. The controller can determine from this data the current workpiece position/location and orientation (angle) in the tooling adapter 20. For further detail as to the operation and interaction of the camera 42 with the manipulator device 2, U.S. patent application Ser. No. 09/783,336, the contents of which are herein incorporated by reference.

The workpiece 22 is adapted to be used in any suitable system, such as an image forming system. An image forming system can include different technologies, such as electrophotographic, electrostatic, electrostatographic, ionographic, acoustic, and inkjets, such as a thermal inkjet, piezo inkjet, and micromechanical inkjet, and other types of image forming or reproducing systems that are adapted to capture and/or store image data associated with a particular object, such as a document, and reproduce, form, or produce an image. Those of ordinary skill will readily recognize that other uses are also envisioned.

The tooling adapter 20 illustrated in FIGS. 3 and 4 provides the manipulator device 2 with the ability to use a single tooling adapter to manipulate, e.g., pick and place, workpieces of varying shapes, sizes and weight without sacrificing component placement accuracy. Because the tooling adapter 20 operates with a minimum of support structure, either reference imaging system 6 or reference imaging system 8 is able to completely view the selected workpiece 22 with the camera without interfering with the motion and use of the manipulator device. Hence, the manipulator device 2 is able to operate with a tooling adapter that provides multiple workpiece pickup points, while concomitantly achieving workpiece placement accuracy of between about 5 microns and about 10 microns.

Figure 5:
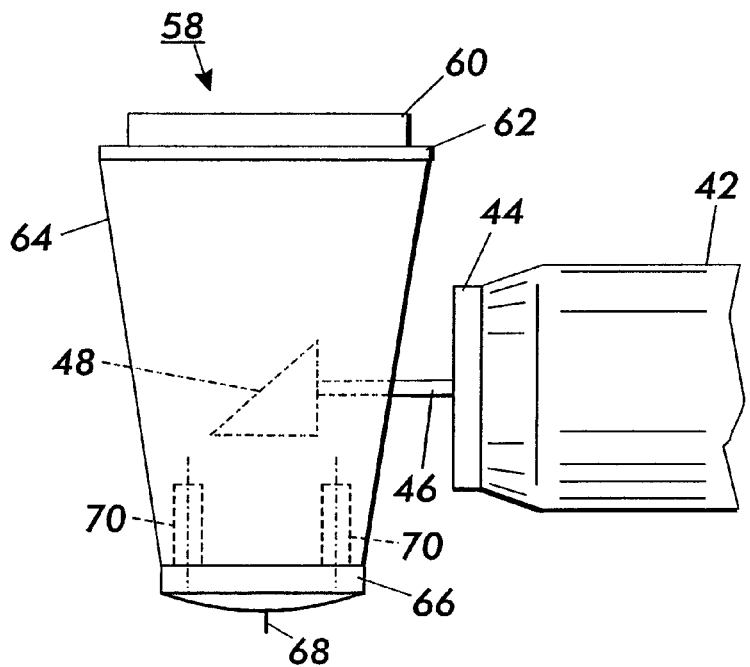
FIG. 5 is a side perspective of an alternative tooling adapter suitable for use in the present invention.
Figure 6:
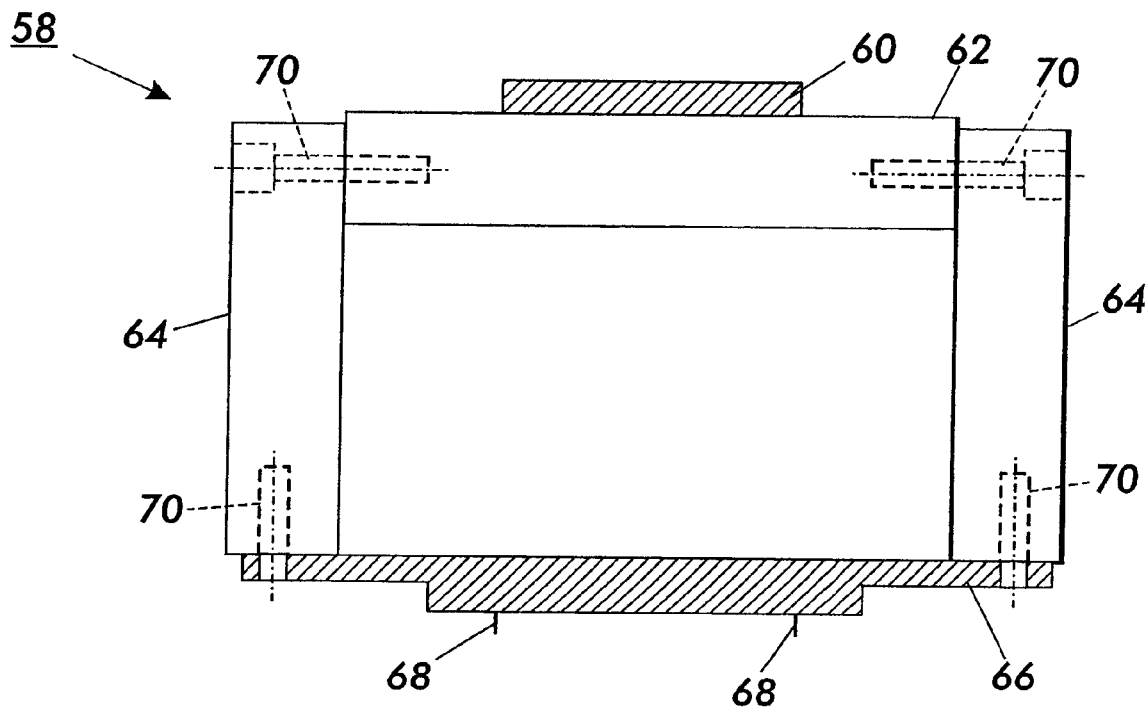
FIG. 6 is a front perspective of an alternative tooling adapter suitable for use in the present invention.
Figure 7:
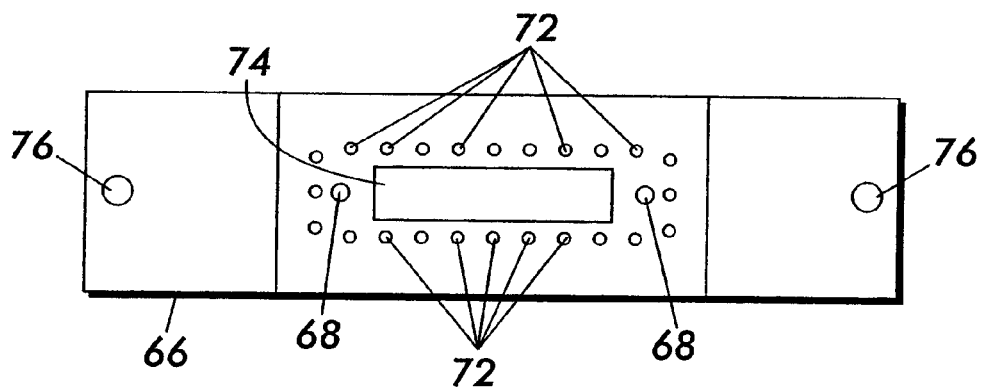
FIG. 7 is a top perspective of the alternative tooling adapter bottom member suitable for use in the present invention.

FIGS. 5 through 7 illustrate an alternate embodiment of the tooling adapter of the present invention. The illustrated tooling adapter 58 includes a housing having a platen 60 for attachment to a quill of the manipulator device 2. One skilled in the art will recognize that any suitable manipulator attachment means can be employed for coupling the tooling adapter to the manipulator device. For example, the manipulator device may utilize a magnetic attachment plate or a threaded attachment plated adapted for use with one or more fasteners. The platen 60 is mounted to the top member 62, which in turn is coupled to the tapered side members 64. Each tapered side 35 member 64 is secured to the tooling adapter base member 66 using fasteners 70. The tooling adapter base member 66 is adapted to have one or more guide pins 68 extend therefrom. Those of ordinary skill in the art will recognize that the structural elements of the tooling adapter may be manufactured from materials such as, aluminum, manganese, fiberglass or other composite material, titanium, or other like materials.

As illustrated in FIG. 6, the tapered side members 64 attach to the outside edge of the tooling adapter top member 62 using fasteners 70. In addition, the bottom member 66 includes throughholes 76 for receiving fasteners 70 in order to couple the base member 66 to the bottom surface of the tapered side members 64.

FIG. 7 depicts the bottom member 66 in more detail. The illustrated base member 66 has a center cut out or window 74 that allows the camera 42 to view a selected workpiece using the optical prism 48, the optical quill 46 and the lens 44. The base member 66 also includes multiple vacuum ports 72 for providing the necessary air vacuum or suction (e.g., negative pressure) to manipulate a selected workpiece 22, such as by retrieving a workpiece from the workpiece source 4 and transporting the workpiece 22 to a desired location on the substrate 18.

The illustrated tooling adapter 58 allows a camera 42 from either image referencing system 6 or 8 to view the workpiece 22 coupled to the tooling adapter. One skilled in the art will recognize that the system need not employ an optical quill and that the optical prism can be mounted directly to the camera. In addition, one skilled in the art will recognize that in certain applications the camera may not need an optical prism to acquire image data of the selected workpiece.

In operation, the tooling adapter 58 is mounted to the quill of the manipulator device 2 via the platen 60. As discussed above, the manipulator device may utilize an alternate mating device other than a quill member. The multiple vacuum ports 72 and optional guide pins 68 allow the manipulator device 2 to manipulate, e.g., pick up, a workpiece having a less than desirable rigidity or stiffness. The optional guide pins 68 ensure an initial macro alignment of the selected workpiece to the tooling adapter 58. The camera 42 provides vision feedback to the controller 11 to further align the selected workpiece with the desired placement location on substrate 18.

To manipulate or retrieve a workpiece, the manipulator device 2 places the tooling adapter 58 in sufficient close proximity to a workpiece in the workpiece source 4, and initiates a vacuum operation that causes the vacuum ports 72 to draw the desired workpiece into contact with the base member 66. Once the manipulator device 2 has picked a desired workpiece, a camera from either reference imaging system 6 or 8 acquires image data associated with the selected workpiece. This data is conveyed to the controller 11, which determines the location and/or orientation of the workpiece. The controller 11 then provides instructions for moving the manipulator device 2 to ensure a workpiece placement accuracy of between about 5 microns and about 10 microns. When the manipulator device 2 places the workpiece upon the substrate at the desired location, the manipulator device 2 removes the vacuum pressure on the selected workpiece to allow the selected workpiece to remain on the substrate 18.

The tooling adapter 58 allows the industrial robot system 10 to accurately assemble electronic devices having non-rigid workpieces. As a result, electronic devices having LED displays may be assembled in high volume using a fully automated process and still retain the benefit of the industrial robot system 10 workpiece placement accuracy of between 5 microns to 10 microns. Hence, electronic assemblies having LED displays that were previously manufactured in semi-automatic fashion using a combination manual operator labor processes and automated machine processes, can now be manufactured in a fully automatic environment without the need for operator intervention.

While the present invention has been described with reference to an illustrative embodiment thereof, those skilled in the art will appreciate that various changes in form and detail may be made without departing from the intended scope of the present invention as defined in the appended claims.

What is claimed is:

1. A system for manipulating a workpiece adapted for subsequent use in an image forming system, comprising:
    a manipulator device for manipulating the workpiece,
    an image referencing system for acquiring image data corresponding to the workpiece, and
    a tooling adapter configured to include a viewing window positioned relative to the image referencing system, the viewing window allowing the image referencing system to acquire the image data corresponding to the workpiece when the tooling adapter is coupled to the manipulator device for manipulating the workpiece in selected engagement therewith.

2. The system of claim 1, further comprising an air bearing assembly coupled to the manipulator device and the image referencing system, wherein at least one of the manipulator device and the image referencing system are adapted for translational movement along the air bearing assembly.

3. The system of claim 1, further comprising a base coupled to one or more support members, said support members supporting the air bearing assembly.

4. The system of claim 1, wherein said image referencing system comprises an image acquisition element.

5. The system of claim 4, wherein said image referencing system further comprises an optical lens coupled to the image acquisition element, and a prism optically coupled to the image acquisition element.

6. The system of claim 5, wherein said image referencing system further comprises a quill disposed between said optical lens and said prism.

7. The system of claim 1, wherein said tooling adapter further comprises a vacuum assembly for applying a force to a workpiece for manipulating the workpiece.

8. The system of claim 1, wherein said tooling adapter comprises a vacuum assembly for applying a force to a workpiece for manipulating the workpiece, thereby enabling the manipulator device to selectively engage the workpiece.

9. The system of claim 1, wherein said tooling adapter comprises a housing have a platen top surface adapted for coupling to the manipulator device, one or more walls coupled to the platen, and a bottom portion coupled to the wall.

10. The system of claim 9, wherein the bottom portion comprises a vacuum assembly.

11. The system of claim 10, wherein the vacuum assembly comprises a plurality of ports for applying a force to the workpiece when disposed in contact therewith.

12. The system of claim 9, wherein the bottom portion further comprises a window for allowing the image referencing system to acquire the image data of the workpiece without interference from the manipulator device.

13. A method for manipulating a workpiece, comprising the steps of manipulating the workpiece with a manipulator device, coupling a tooling adapter having a workpiece viewing window to the manipulator device, and acquiring image data corresponding to the workpiece without interference from the manipulator device by imaging the workpiece through the workpiece viewing window of the tooling adapter.

14. A system for manipulating a workpiece adapted for subsequent use in an image forming system, comprising:

a manipulator device for manipulating the workpiece, a tooling adapter having a vacuum assembly for applying a force to a workpiece for manipulating the workpiece, the tooling adapter configured for coupling to the manipulator device for manipulating the workpiece when disposed in selected engagement therewith, and an image referencing system disposed in optical communication with the tooling adapter for acquiring image data corresponding to the workpiece.

15. The system of claim 14, further comprising an air bearing assembly coupled to the manipulator device and the image referencing system, wherein at least one of the manipulator device and the image referencing system are adapted for translational movement along the air bearing assembly.

16. The system of claim 14, wherein said image referencing system comprises an image acquisition element.

17. The system of claim 14, wherein the vacuum assembly comprises a plurality of ports for applying a force to the workpiece when disposed in contact therewith.

* * * * *